(12) United States Patent
Kung

(10) Patent No.: US 6,604,098 B1
(45) Date of Patent: Aug. 5, 2003

(54) METHOD AND SYSTEM IN A COMPUTER NETWORK FOR SEARCHING AND LINKING WEB SITES

(75) Inventor: Tien Mei Kung, Sheung Wan (HK)

(73) Assignee: Viagold Direct Network Limited, Causeway Bay (HK)

(*) Notice: Subject to any disclaimer, the term of this patent is extended or adjusted under 35 U.S.C. 154(b) by 166 days.

(21) Appl. No.: 09/624,537

(22) Filed: Jul. 24, 2000

(51) Int. Cl.[7] .............................................. G06F 17/30
(52) U.S. Cl. ........................................................ 707/3
(58) Field of Search .............................. 707/2, 3, 4, 5, 707/6, 10, 100, 101, 104.1, 526; 382/149; 704/5, 251, 254; 706/15, 54; 709/218, 238, 319

(56) References Cited

U.S. PATENT DOCUMENTS 6,070,160 A * 5/2000 Geary ...................... 382/149
6,266,668 B1 * 7/2001 Vanderveldt et al. ......... 706/15
6,401,084 B1 * 6/2002 Ortega et al. ................. 704/5

* cited by examiner

Primary Examiner—Diane D. Mizrahi
Assistant Examiner—Apu M Mofiz
(74) Attorney, Agent, or Firm—Mikio Ishimaru

(57) ABSTRACT

A method and a system of searching web site that can display the content of searched homepage to users' browsers if their browsers connect the searching system through internet is described. Users can look for other web site of their interest by entering complete or incomplete numerals or texts in an input box on the page of the searching system. The searching system then searches the required web site for the users by using complete comparison or fuzzy comparison and displays the content of searched homepage to users' browsers. Users can also click on a pop-up menu for searching other web sites. The searching system can display the content of the found web site to the browsers of clients via internet.

5 Claims, 10 Drawing Sheets

FIG. 3

21 displaying the entry web site of searching system to the browsers of client computers

22 users entering request in the input box of the entry web site

23 search engine comparing input with homepage database for searching the TCP/IP addresses or complete domain names corresponding to the input

24 message control module connecting the found web sites

25 message output module transferring the data or messages of the found web site to the browsers of client computers

FIG. 9

| words | TCP/IP addresses or complete domain names corresponding to the words | | |
|---|---|---|---|
| computer software | 192.123.1.1 | 168.3.4.2 | 140.113.1.4 |
| computer hardware | 152.123.2.1 | 169.3.5.2 | 140.115.13.4 |
| computer firmware | 192.103.1.1 | 168.3.41.2 | 139.113.1.4 |

FIG. 10

| number | TCP/IP address or complete domain name corresponding to the numeral |
|---|---|
| 112 | 192.169.3.1 |
| 113 | 192.169.3.11 |
| 114 | 192.169.4.1 |
| 115 | 192.169.23.1 |
| 120 | 192.100.3.1 |
| 121 | 192.100.3.11 |
| 122 | 192.100.3.21 |
| 130 | 192.175.3.1 |
| 131 | 192.176.3.1 |
| 132 | 192.180.3.28 |

METHOD AND SYSTEM IN A COMPUTER NETWORK FOR SEARCHING AND LINKING WEB SITES

BACKGROUND OF THE INVENTION

1. Field of the Invention

The present invention relates to systems for searching web sites and, more particularly, to a system of searching web sites by which users can search for and connect desired web sites by entering web site codes in an input box on the homepage of the searching system. The present invention also relates to a method of using the system for searching web sites.

2. Background of the Invention

General entry web sites, such as Yahoo, provide the function of searching other web sites desired for users. In other words, users can type a key word or a set of key words with respect to the desired web site one at a time in an input box on a homepage of the entry web sites for searching and connecting the desired web site. Here a key word means an English vocabulary or a Chinese character while a set of key words mean more than one English vocabulary or more than one Chinese character.

For example, if a user wants to search the web site in the world Wide Web relating to computer network, he or she has to type a set of key words, "computer network", in the input box of an entry web site. The entry web site then performs to search web sites relating to "computer network". However, if the user misspells the key words intended to be used for searching, for example, he or she types "compute network", "computer etwork" or "compute etwork", the general entry web site can not find any web sites desired for the user because it is unable to obtain a successful match within web site information stored in its database in terms of the misspelled words. Further, users can also search web sites by inputting numerals. However, an entry web site can not locate and connect the web site desired by the user, if the desired web site relates to a string of numerals of 023 while the user incorrectly input 02 or 02333.

In addition, searching systems used by general entry web sites usually do not provide classification function in terms of numeral. For example, a numeral of "0" can represent the class of web sites relating to computer so that the homepage of the general entry web site connected to a user's browser will show web sites with regard to computer in response to "0" input by the user through his or her browser. Likewise, a two-digit number starting with "0" can stand for sub-classes under the class of computer; for example, "01" represents the sub-class of web sites about computer hardware, and "02" stands for sub-class of web sites about computer software.

Therefore in the input box of homepages of conventional general entry web sites users have to enter complete or correct web site codes or click on a pop-up menu for searching desired web sites. If the words input by the user are misspelled or incomplete, the entry web sites cannot successfully perform the search request. Moreover, general entry web sites cannot perform web site search by inputting numerals in terms of a classification catalogue pre-established in the general entry web sites. Therefore there is a need for a method and a system of searching web pages that can perform web site search regardless of the completeness or correctness of codes input by the user.

SUMMARY OF THE INVENTION

The primary objective of the present invention is to provide a system for searching web sites, which allows users to successfully search and connect desired web sites even though the web site codes input by the users are incorrect or incomplete.

Another objective of the present invention is to provide a system for searching web sites that allows users to input web site codes other than conventional words.

Still another objective of the present invention is to provide a system for searching web sites, that can perform a web site search in a classification way to thereby make the search easier to perform than the prior art.

The system for searching web sites consists of an entry web site, a search engine, a homepage database, a message control module, and a message output module.

The entry web site is used for users to input, numerals or words, and to send input data to search engine for further process.

The search engine is used to receive the input data sent from the entry web site. The search engine is able to compare the input data with homepage database and identify the data of searched web sites corresponding to the input data. The comparison methods used by the search engine can be complete or fuzzy. After finding out the data of entry web sites for the input, the search engine sends the TCP/IP addresses or complete domain names corresponding to the data to the message control module.

Homepage database stores input words or numerals and their corresponding TCP/IP addresses or complete domain names. Every word or numeral has its corresponding TCP/IP address or complete domain name. Database uses digits of numerals to classify input data. For example, a numeral starting with "0" can represent the catalogue of web pages about computer; under the same catalogue, the second digit of the numeral can be used for sub-classification, for example, "01" representing the catalogue of web pages about computer hardware, and "02" about software. In either case, the first digit is "0", which is about computer. The second digits, "1" representing hardware in the former case and "2" representing software in the latter case, then are for sub-classification.

The message control module uses the TCP/IP addresses or complete domain names sent from search engine and finds the sites for users. The module then sends the data or messages of the found web site to the browsers of clients.

The message output module is controlled by the message control module and it sends the data or messages of the found web site to the browsers of clients via internet.

To use the searching system of the present invention, users enter the TCP/IP address or complete domain name of the searching system of web site in the input URL boxes of their browser pages. Through the request of connecting to the searching system according to hypertext transfer protocol (HTTP), the homepage of the searching system of the web site then displays on users' browser pages on local clients. Users then enter words or numerals for their search request in the input box of the homepage of the searching system after the connection between clients and the searching system is established. The entry web site then sends the data in the input box to search engine. The search engine of the searching system then searches the required web site according to the data by using complete comparison or fuzzy comparison. Either the corresponding TCP/IP addresses or domain names of searched homepages are identified and sent to message control module. Message control module then tries to connect the web sites of the TCP/IP addresses or domain names. Message output module, which is controlled by the message control module, then transmits the content of the homepages of the connected web sites to the browsers of clients for displaying.

BRIEF DESCRIPTION OF DRAWINGS

The above and other objects, features, and advantages of the present invention will become apparent from the following description when taken in conjunction with the accompanying drawings which illustrate preferred embodiments of the present invention by way of examples. The contents of accompanying drawings are described as followings:

FIG. 3 is a flow diagram, illustrating the procedures of the method for searching web sites according to the present invention;

FIG. 9 is a diagram showing the word database of the system for searching web sites according to the embodiments shown in FIGS. 5 and 7, for illustrating the relationship between the data stored in the database and corresponding TCP/IP addresses or complete domain names; and FIG. 10 is a diagram showing the numeral database of the system for searching web sites according to the embodiments shown in FIGS. 6 and 8, for illustrating the relationship between the data stored in the database and corresponding TCP/IP addresses or complete or complete domain names.

DETAILED DESCRIPTION OF PREFERRED EMBODIMENTS

Figure 1:
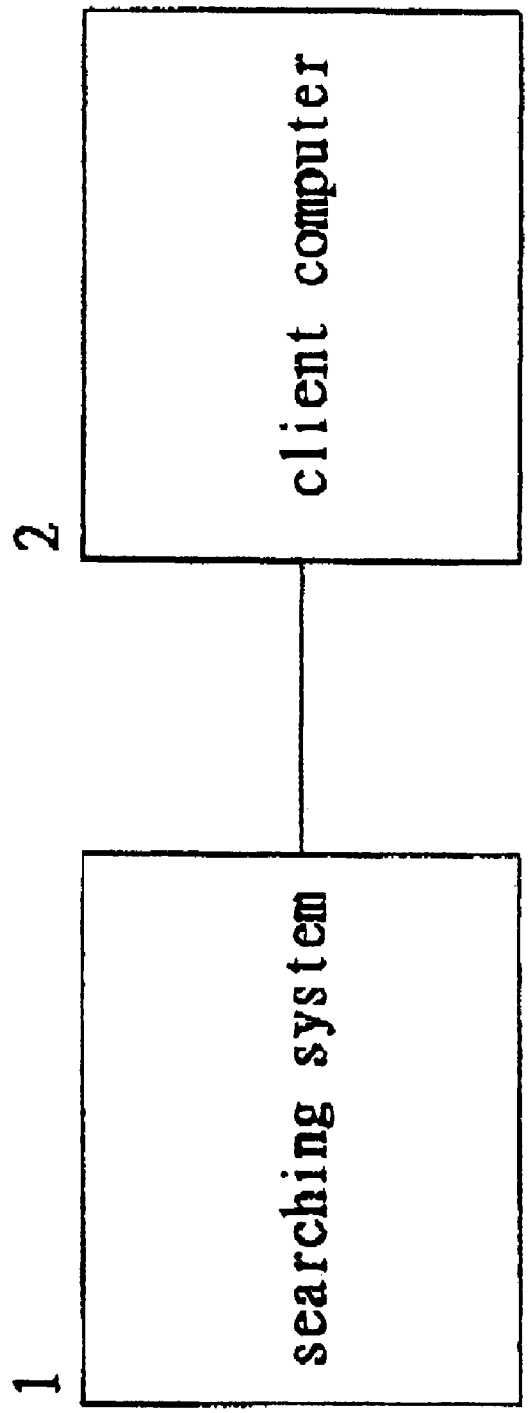
FIG. 1 is a block diagram illustrating the connection of the system for searching web sites according to the present invention, and a client computer.

FIG. 1 is a block diagram illustrating the connection of the system for searching web site according to the present invention and a client computer. As shown in the drawing, a client computer 2 connects the searching system 1 of the entry web site for search through internet. The content of homepage of the searching system 1 is displayed on user's browser of client computer 2. Users enter complete or incomplete numerals or texts in an input box on the homepage of the searching system. The searching system then searches the required web site for the users by using complete comparison or fuzzy comparison. The input method used on the homepage of the searching system can also be done by clicking on a pop-up menu. In addition, the searching system displays the content of searched homepage to users' browsers if there are any web sites found.

Figure 2:
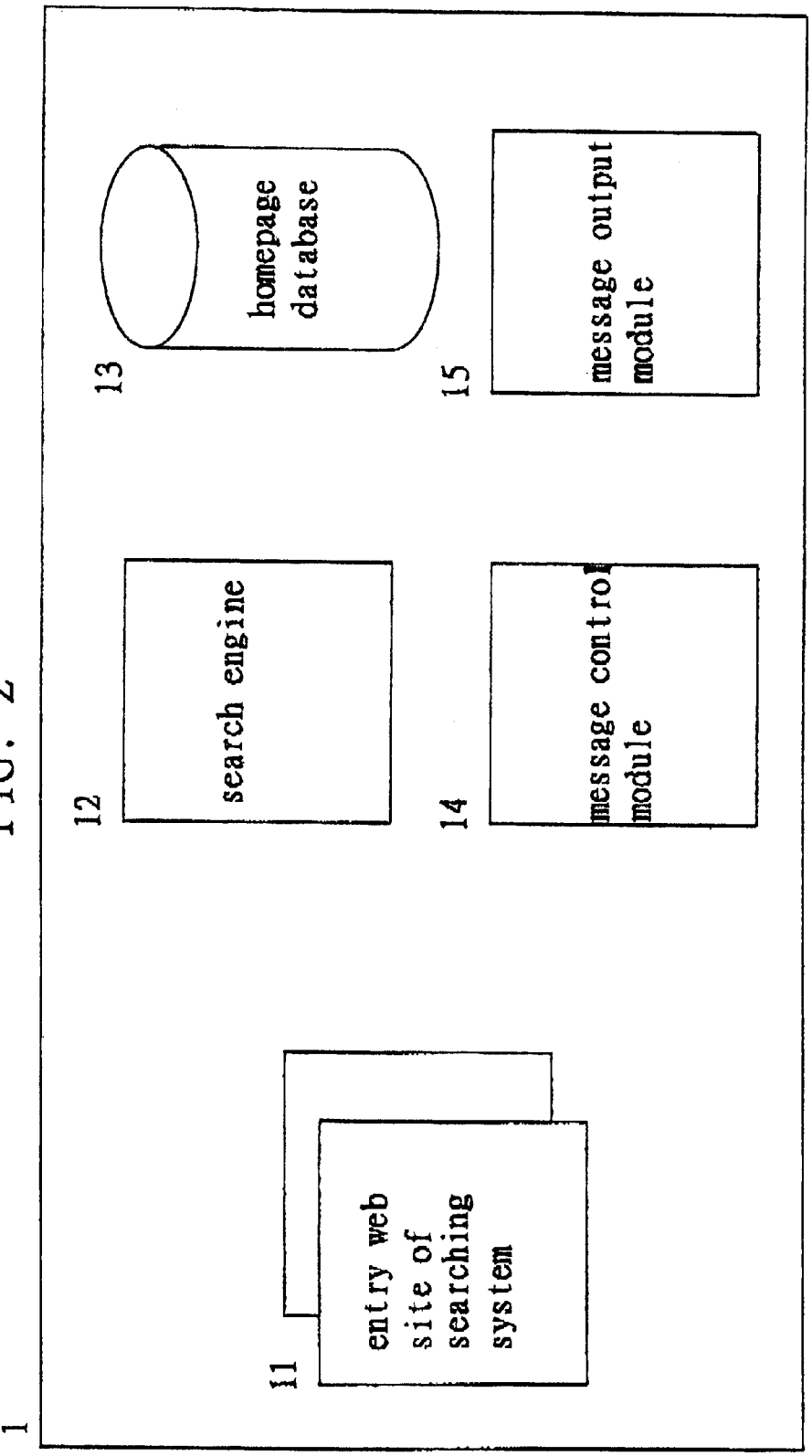
FIG. 2 is a system block diagram, illustrating the basic architecture of the system for searching web sites according to the present invention.

FIG. 2 is a system block diagram, illustrating the basic architecture of the system for searching web site according to the present invention. As shown in the figure, the searching system 1 consists of entry web site 11, search engine 12, homepage database 13, message control module 14, and message output module 15.

The entry web site 11 of the searching system 1 is used to accept input data, that is numerals or words entered by users, and to send the input data to search engine 12 for further process.

The search engine 12 is used to receive the input data sent from the entry web site 11. The search engine 12 compares the input data with the homepage database 13 and identifies the data of searched web sites corresponding to the input. The comparison methods used by the search engine 12 can be complete or fuzzy. After finding out the data of entry web sites for the input, the search engine 12 sends the TCP/IP addresses or complete domain names corresponding to the data to the message control module 14.

Homepage database 13 consists of word correspondence database 131 and numeral correspondence database 132. Word correspondence database 131 stores words and their corresponding data of TCP/IP addresses or complete domain names. Numeral correspondence database 132 stores numeral and their corresponding data of TCP/IP addresses or complete domain names. Each word or numeral had its own corresponding data of TCP/IP address or complete domain name. The numeral correspondence database 132 of homepage database 13 uses digits of numerals to classify input data. For example, a numeral starting with "1" can represent the catalogue of web pages about finance. Under the same catalogue, the second digit of the numeral can be used for sub-classification, for example, "11" representing the catalogue of web pages about bank of finance, and "12" about insurance of finance. In either case, the first digit is "1", that is, the digit for the homepage catalogues about finance. The second digits, "1" representing banks in the former case and "2" representing insurance in the latter case, then are for sub-classification.

The message control module 14 uses the TCP/IP addresses or complete domain names sent from search engine 12 for searching sites for users. It also makes user's browsers connect found web sites and transfers the data or messages of the found web site to the browsers of clients through message control module 15.

The message output module 15 is controlled by the message control module 14 for transferring the data or messages of the found web site to the browsers of client computers 2 that connect the searching system 1 via internet.

FIG. 3 is a flow diagram, illustrating the procedures of searching entry web sits by using the method and system of searching web site according to the present invention. As shown in the figure, in step 21 the content of the found entry web site 11 of the searching system displays on the browsers of client computers 2. The procedure proceeds to step 22.

In step 22, users enter request, which can be words or numerals, in the input box for search on the entry web site 11 (not shown in the figure). The input words or numerals are not necessarily complete and they are sent to search engine 12 for further process. The procedure proceeds to step 23.

In step 23, the search engine 12 compares the input from web homepage 12 with homepage database 13 and identifies the data of searched web sites corresponding to the input. The comparison methods used by the search engine 12 can be complete or fuzzy. After finding out the data of entry web sites for the input, the search engine 12 sends the TCP/IP addresses or complete domain names corresponding to the data to the message control module 14. The procedure then proceeds to step 24.

In step 24, message control module 14 uses the TCP/IP addresses or complete domain names sent from search engine 12 for searching sites for users. It also makes user's browsers connect found web sites and transfers the data or messages of the found web site to the browsers of client computers 2 through message control module 15. The procedure then proceeds to step 25.

In step 25, message output module 15 is controlled by the message control module 14 for transferring the data or messages of the found web site to the browsers of client computers 2 that connect the searching system 1 via internet.

Figure 4:
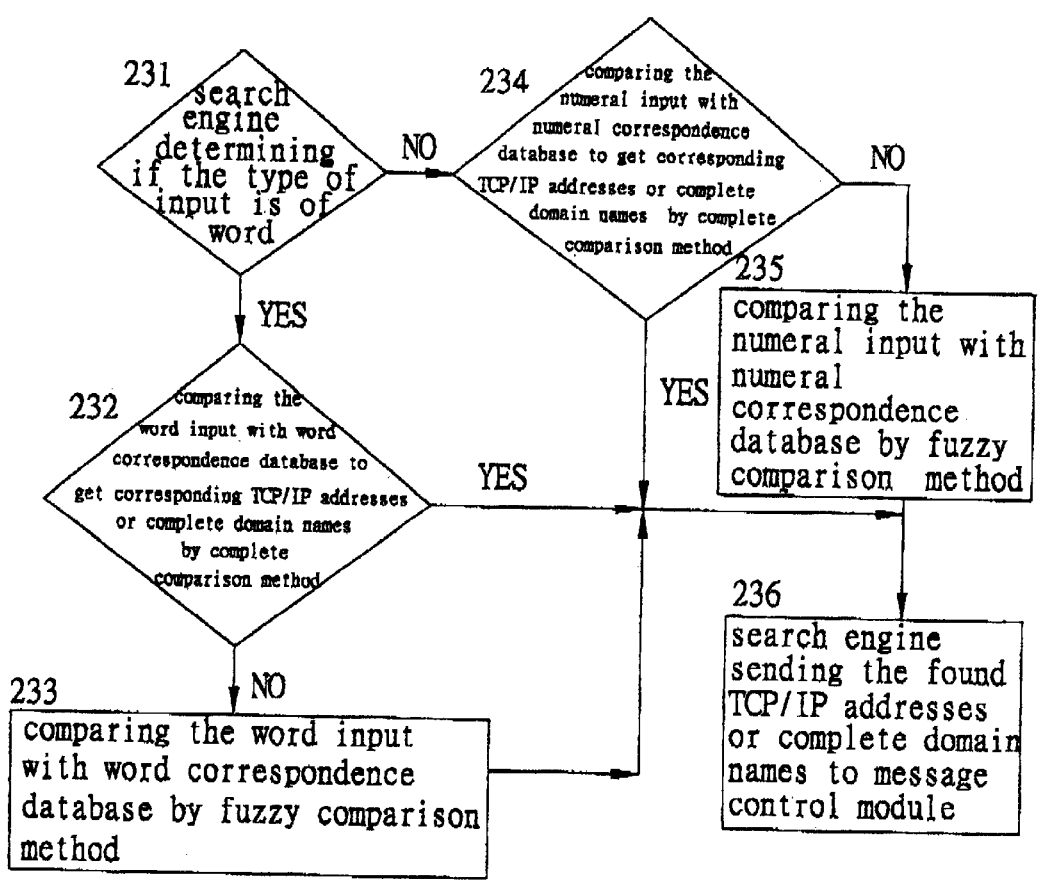
FIG. 4 is a flow diagram, illustrating in detail the procedures of comparison of the homepage database with input data conducted by the search engine shown in FIG. 3.

FIG. 4 is a flow diagram, illustrating in detail the procedure of comparison with homepage database conducted by the search engine in FIG. 3. As shown in the figure, in step 231 search engine 12 determines the type of the input from web homepage 11. If the type of the input is words, the procedure proceeds to step 232; if numerals, step 234.

In step 232, search engine 12 compares the input words with word correspondence database 131 by complete comparison method. If the corresponding TCP/IP addresses or complete domain names for the requested web sites can be found from the comparison, the procedure proceeds to step 236; otherwise, the procedure proceeds to step 233.

In step 233, search engine 12 compares the input words with word correspondence database 131 to get the TCP/IP addresses or complete domain names for the input by fuzzy comparison method. The comparison is targeted on searching those data that are closest to the requested web site. In the word correspondence database 131, each record is represented by a word combination, which in turn corresponds to the data of entry web site. For example, the word combination for the data about computer can be "computer software", "computer hardware", and "computer firmware". If the input is "computer software", the search engine 12 will compare the input with word correspondence database 131 by fuzzy method. Because there is no "computer software" in the word correspondence database 131, the search engine will try to resolve the input by searching the closest word combination for it and get the word combination "computer software" and its TCP/IP address or complete domain name. If the input is "computer software group", of which the number of words is 3 and is greater than 2, that is, the number of words for each record, the search engine 12 will take only the first 2 words, "computer software" in this case, for fuzzy comparison. Therefore "computer software" or its closest word combination is identified and its corresponding TCP/IP address or complete domain name is resolved, too. The procedure proceeds to step 236.

In step 234, search engine 12 compares the numeral input with numeral correspondence database 132 by complete comparison method. If the corresponding TCP/IP addresses or complete domain names for the requested web sites can be found from the comparison, the procedure proceeds to step 236; otherwise, the procedure proceeds to step 235.

In step 235, search engine 12 compares the input numeral with numeral correspondence database 132 to get the TCP/IP addressed or complete domain names for the input by fuzzy comparison method. The numeral correspondence database 132 uses digits of numerals to classify input data. For example, numeral correspondence database 132 can use 3-digit numeral for each datum that corresponds to a web homepage. If the input is a 2-digit numeral, the search engine 12 will compare it with numeral correspondence database 132 to get the closest 3-digit numbers by fuzzy comparison method. Suppose there are the 3-digit numbers [112], [113], [114], [115], [120], [121], [122], [130], [131], and [132] in the numeral correspondence database 132. The fuzzy comparison method will resolve [112], [113], [114] and [115] if the input numeral is [11]. The TCP/IP addresses or complete domain names for the resolved numbers will be identified, too. On the other hand, if the input is a 4-digit number, [1122], of which the number of digits is greater than 3, the search engine 12 will take only the first 3 digits, that is, [112], for the fuzzy comparison. And the result is [112] and its corresponding TCP/IP address or complete domain name. The procedure proceeds to step 236.

In step 236, search engine 12 sends the found TCP/IP addresses or complete domain names to the message control module 14 of the search system 1: FIG. 4 is an embodiment of the flow chart of the procedure of searching entry web sites according to the method and system of searching web site of the present invention, in which the input is words. As shown in the step 31 of the figure, when the computer 2 of client connects internet, users can enter in the input URL box on their browsers the found TCP/IP addresses or complete domain names on the entry web site 11 of the searching system 1. This asks the searching system to connect internet according to the entered TCP/IP addresses or complete domain names by HTTP and to display the content of the entry web site 11 on user's browsers. The procedure proceeds to step 32.

In step 32, the computer 2 of client connects searching system 1 and the content of the entry web site 11 displays on users' browsers. As an example, users can enter the words [computer hardware] in the input box for search on the entry web site 11 (not shown in the figure). The entry web site 11 then sends the input to searching engine 12. The procedure proceeds to step 33.

In step 33, the searching engine 12 identifies the input from the entry web site 11 as words. The procedure proceeds to step 34.

In step 34, search engine 12 compares the input words with word correspondence database 131 by complete comparison method. Suppose there are word combinations of [computer software], [computer hardware] and [computer firmware] in the word correspondence database 131. The complete comparison method will resolve [computer hardware]. The TCP/IP addresses or complete domain names for the resolved word combination will be identified, too. The procedure proceeds to step 35.

In step 35, search engine 12 sends the found TCP/IP addresses or complete domain names to the message control module 14 of the search system 1. The procedure proceeds to step 36.

In step 36, the message control module 14 uses the TCP/IP addresses or complete domain names sent from search engine 12 for searching sites for users. It also makes user's browsers connect found web sites and transfers the data or messages of the found web site to the browsers of client computers 2 through message control module 15. The procedure proceeds to step 37.

In step 37, the message output module 15 is controlled by the message control module 14 for transferring the data or messages of the found web site to the browsers of client computers 2 that connect the searching system 1 via internet.

Figure 6:
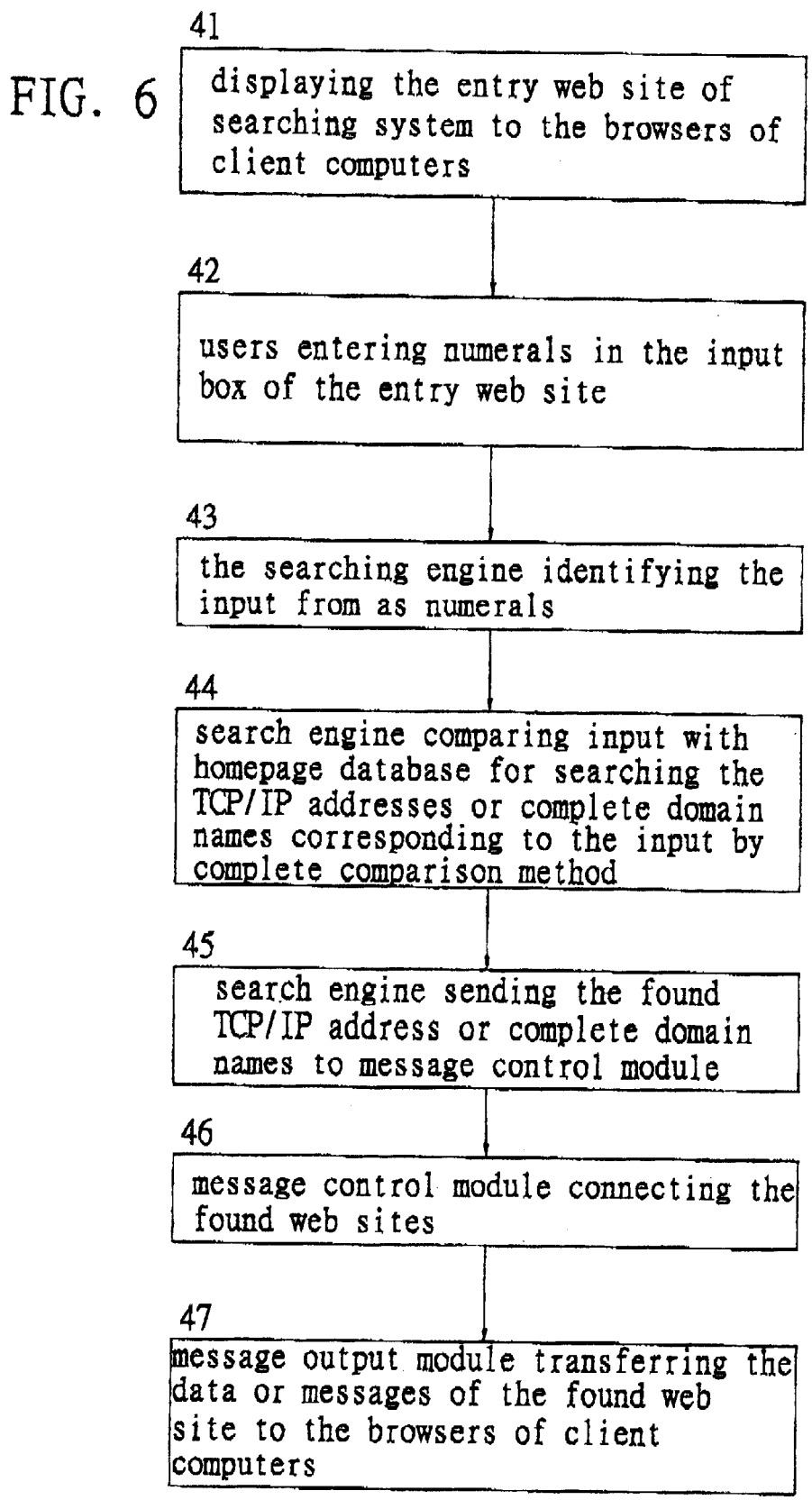
FIG. 6 is a flow chart showing another embodiment of the procedures for searching web site of the present invention.

FIG. 6 is an embodiment of the flow chart of the procedure of searching entry web sites according to the method and system of searching web site of the present invention, in which the input is numeral. As shown in the figure, in step 41 the content of the found entry web site 11 of the searching system displays on the browsers of client computers 2. The procedure proceeds to step 42.

In step 42, users enter numeral request, for example, [113], in the input box for search on the entry web site 11 (not shown in the figure). The input numeral is sent to search engine 12 for further process. The procedure proceeds to step 43.

In step 43, search engine 12 compares the input numeral [113] with numeral correspondence database 132 by complete comparison method. The numeral correspondence database 132 uses digits of numerals to classify input data. For example, numeral correspondence database 132 can use 3-digit numeral for each datum that corresponds to a web homepage. Suppose there are the 3-digit numbers [112], [113], [114], [115], [120], [121], [122], [130], [131], and [132] in the numeral correspondence database 132. The complete comparison method will resolve [113] if the input numeral is [113]. The TCP/IP addresses or complete domain names for the resolved number will be identified, too. The procedure proceeds to step 45.

In step 45, search engine 12 sends the found TCP/IP addresses or complete domain names to the message control module 14 of the search system 1. The procedure proceeds to step 46.

In step 46, the message control module 14 uses the TCP/IP addresses or complete domain names sent from search engine 12 for searching sites for users. It also makes user's browsers connect found web sites and transfers the data or messages of the found web site to the browsers of client computers 2 through message control module 15. The procedure proceeds to step 47.

In step 47, the message output module 15 is controlled by the message control module 14 for transferring the data or messages of the found web site to the browsers of client computers 2 that connect the searching system 1 via internet.

Figure 7:
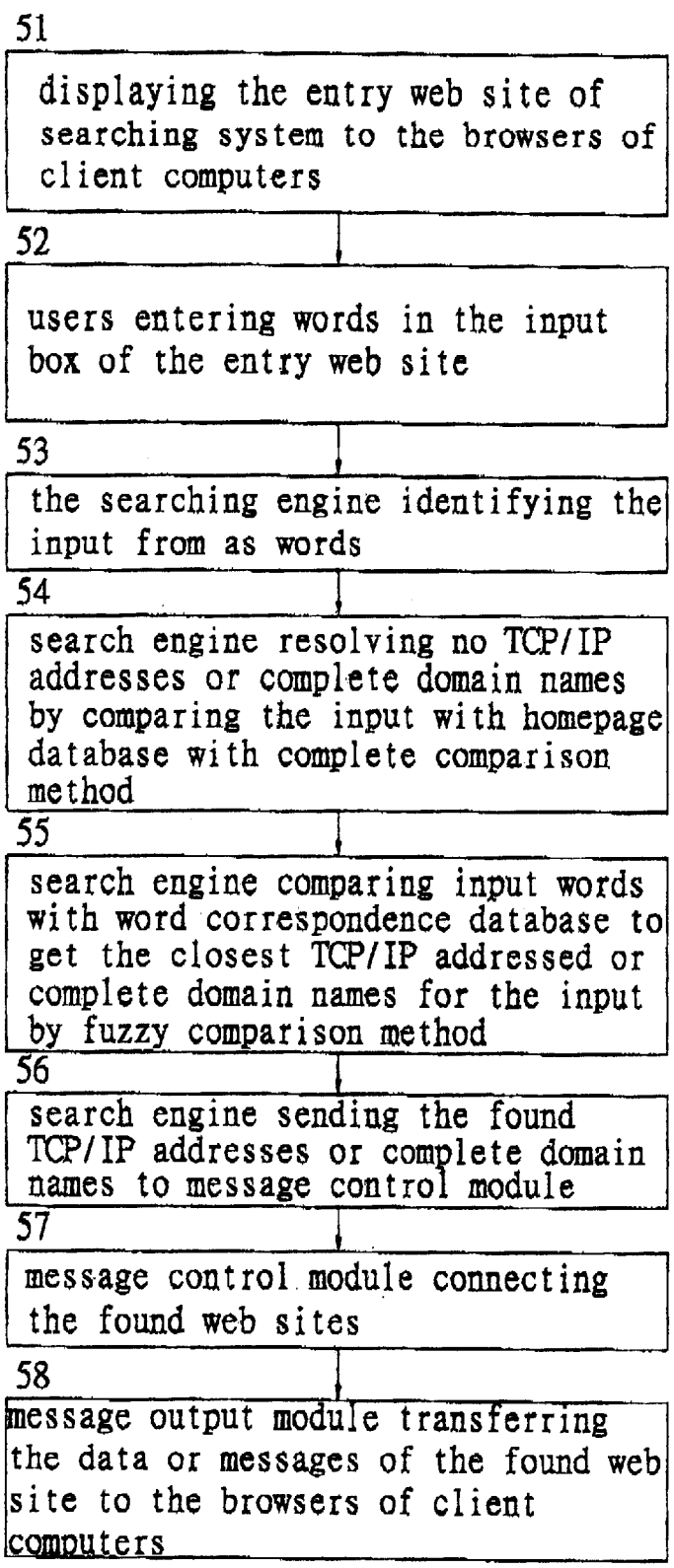
FIG. 7 is a flow chart showing a further embodiment of the procedures for searching web site of the present invention.

FIG. 7 is an embodiment of the flow chart of the procedure of searching entry web sites according to the method and system of searching web site of the present invention, in which the input is words and the applied method is fuzzy comparison. As shown in the figure, in step 51 the content of the found entry web site 11 of the searching system displays on the browsers of client computers 2. The procedure proceeds to step 52.

In step 52, users enter request, for example, [computer softwear], in the input box for search on the entry web site 11 (not shown in the figure). The input is sent to search engine 12 for further process. The procedure proceeds to step 53.

In step 53, the searching engine 12 identifies the input from the entry web site 11 as words. The procedure proceeds to step 54.

In step 54, search engine 12 compares the input words with word correspondence database 131 by complete comparison method. Suppose there are word combinations of [computer software], [computer hardware] and [computer firmware] in the word correspondence database 131. However, no word combination is identified from the complete comparison if the input is [computer softwear]. Therefore, no TCP/IP addresses or complete domain names for the requested word combination is identified. The procedure proceeds to step 55.

In step 55, search engine 12 compares the input words with word correspondence database 131 to get the TCP/IP addressed or complete domain names for the input by fuzzy comparison method. The comparison is targeted on searching those data that are closest to the requested web site. In the word correspondence database 131, each record is represented by a word combination, which in turn corresponds to the data of entry web site. For example, the word combination for the data about computer can be "computer software", "computer hardware", and "computer firmware". If the input is "computer softwear", the search engine 12 will compare the input with word correspondence database 131 by fuzzy method. Because there is no "computer softwear" in the word correspondence database 131, the search engine will try to resolve the input by searching the closest word combination for it and get the word combination "computer software" and its TCP/IP address or complete domain name. The procedure proceeds to step 56.

In step 56, search engine 12 sends the found TCP/IP addresses or complete domain names to the message control module 14 of the search system 1. The procedure proceeds to step 57.

In step 57, the message control module 14 uses the TCP/IP addresses or complete domain names sent from search engine 12 for searching sites for users. It also makes user's browsers connect found web sites and transfers the data or messages of the found web site to the browsers of client computers 2 through message control module 15. The procedure proceeds to step 58.

In step 58, the message output module 15 is controlled by the message control module 14 for transferring the data or messages of the found web site to the browsers of client computers 2 that connect the searching system 1 via internet.

Figure 8:
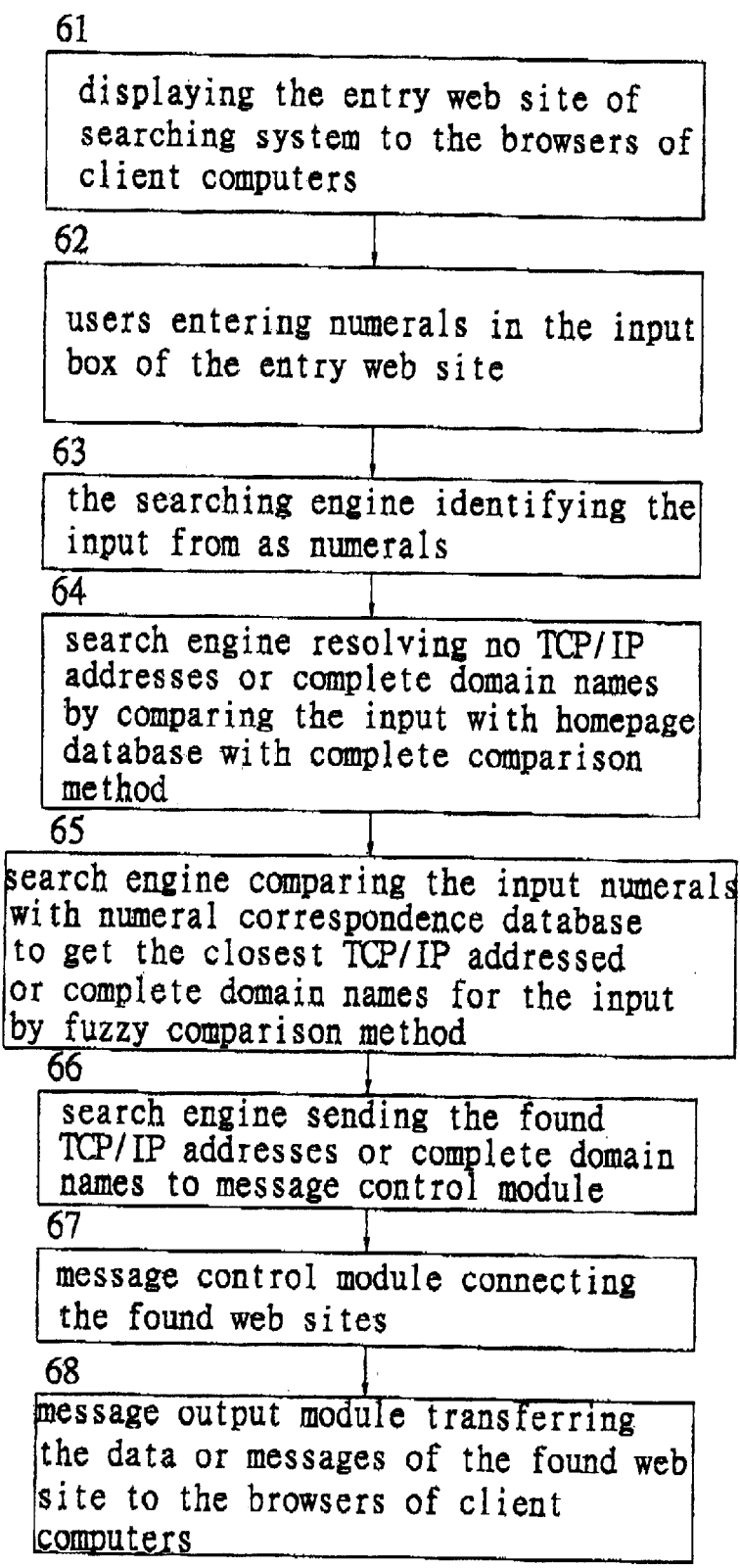
FIG. 8 is a flow chart showing another embodiment of the procedures for searching web site of the present invention.

FIG. 8 is an embodiment of the flow chart of the procedure of searching entry web sites according to the method and system of searching web site of the present invention, in which the input is numeral and the applied method is fuzzy comparison. As shown in the step 61 of the figure, when the computer 2 of client connects internet, users can enter in the input URL box on their browsers the found TCP/IP addresses or complete domain names on the entry web site 11 of the searching system 1. This asks the searching system to connect internet according to the entered TCP/IP addresses or complete domain names by HTTP and to display the content of the entry web site 11 on users' browsers. The procedure proceeds to step 62.

In step 62, the computer 2 of client connects searching system 1 and the content of the entry web site 11 displays on users' browsers. As an example, users can enter the numeral [11] in the input box for search on the entry web site 11 (not shown in the figure). The entry web site 11 then sends the input to searching engine 12. The procedure proceeds to step 63.

In step 63, the searching engine 12 identifies the input from the entry web site 11 as words. The procedure proceeds to step 64.

In step 64, search engine 12 compares the input numeral [11] with numeral correspondence database 132 by complete comparison method. The numeral correspondence database 132 uses digits of numerals to classify input data. For example, numeral correspondence database 132 can use 3-digit numeral for each datum that corresponds to a web homepage. Suppose there are the 3-digit numbers [112], [113], [114], [115], [120], [121], [122], [130], [131], and [132] in the numeral correspondence database 132. The complete comparison method will not find a 3-digit number for the input [11]. Therefore the TCP/IP addresses or complete domain names for the requested number will be not identified. The procedure proceeds to step 65.

In step 65, search engine 12 compares the input numeral with numeral correspondence database 132 to get the TCP/

IP addressed or complete domain names for the input by fuzzy comparison method. Suppose there are the 3-digit numbers [112], [113], [114], [115], [120], [121], [122], [130], [131], and [132] in the numeral correspondence database 132. The fuzzy comparison method will resolve [112], [113], [114] and [115] if the input numeral is [11]. The TCP/IP addresses or complete domain names for the resolved numbers will be identified, too. The procedure proceeds to step 66.

In step 66, search engine 12 sends the found TCP/IP addresses or complete domain names to the message control module 14 of the search system 1. The procedure proceeds to step 67.

In step 67, the message control module 14 uses the TCP/IP addresses or complete domain names sent from search engine 12 for searching sites for users. It also makes user's browsers connect found web sites and transfers the data or messages of the found web site to the browsers of client computers 2 through message control module 15. The procedure proceeds to step 68.

In step 68, the message output module 15 is controlled by the message control module 14 for transferring the data or messages of the found web site to the browsers of client computers 2 that connect the searching system 1 via internet.

Figure 5:
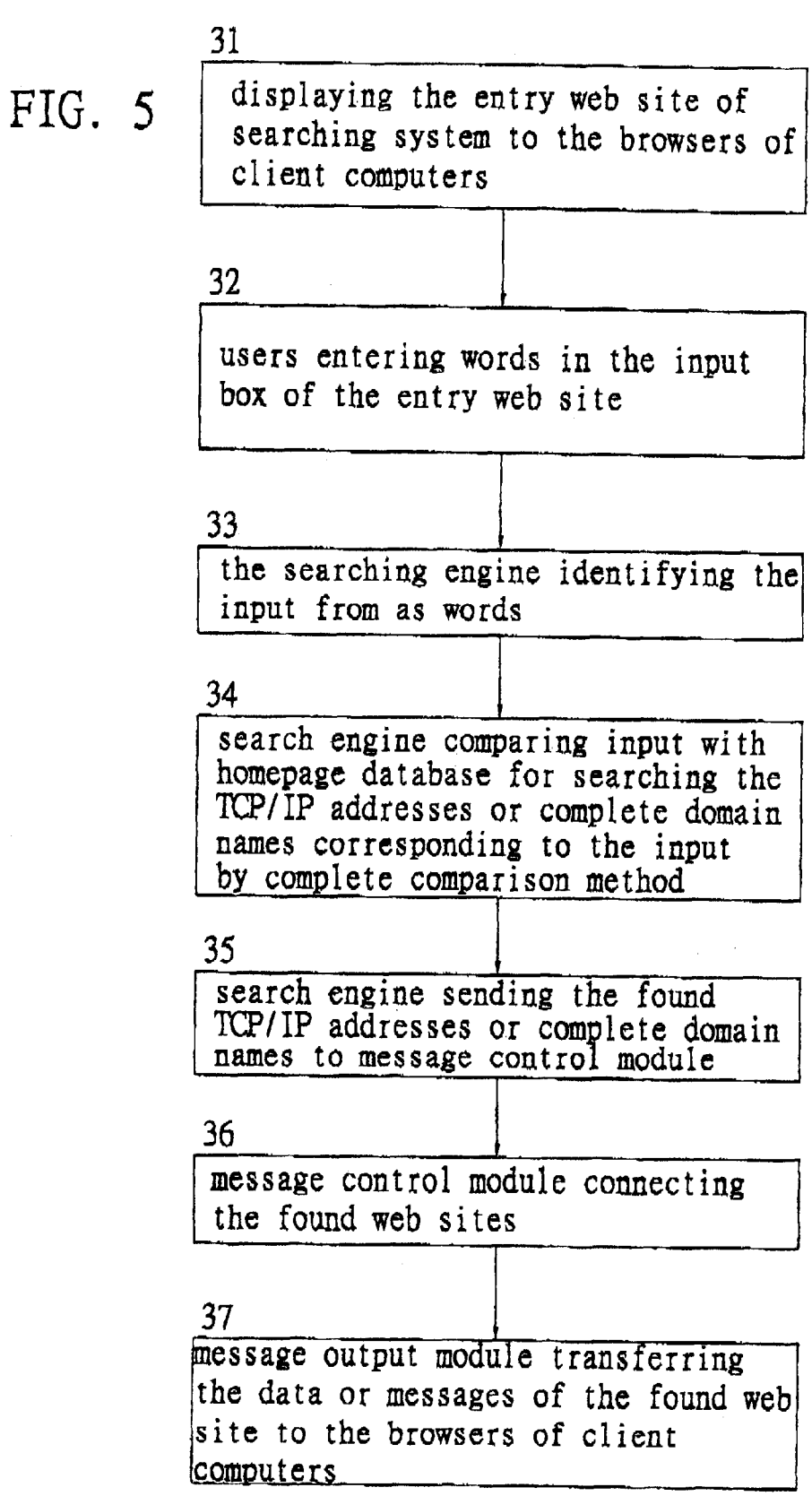
FIG. 5 is a flow chart showing an embodiment of the procedures of the method for searching web sites of the present invention.

FIG. 9 is the diagram of the word database of the system of searching web homepage according to the embodiments in FIGS. 5 and 7, illustrating the relationship between the words stored in the database and corresponding TCP/IP addresses or complete domain names. As shown in the figure, the TCP/IP addresses corresponding to the word combination [computer software] are 192.123.1.1, 168.3.4.2 and 140.113.1.4; the TCP/IP addresses corresponding to the word combination [computer hardware] are 152.123.2.1, 169.3.5.2 and 140.115.13.4; the TCP/IP addresses corresponding to the word combination [computer firmware] are 192.103.1.1, 168.3.41.2 and 139.113.1.4.

FIG. 10 is the diagram of the numeral database of the system of searching web homepage according to the embodiments in FIGS. 6 and 8, illustrating the relationship between the numeral stored in the database and corresponding TCP/IP addresses or complete domain names. As shown in the figure, the 3-digit numbers for representing data are [112], [113], [114], [115], [120], [121], [122], [130], [131], and [132] in the numeral correspondence database 132. The TCP/IP address corresponding to [112] is 192.169.3.1; the TCP/IP address corresponding to [113] is 192.169.3.11; the TCP/IP address corresponding to [114] is 192.169.4.1; the TCP/IP address corresponding to [115] is 192.169.23.1; the TCP/IP address corresponding to [120] is 192.100.3.1; the TCP/IP address corresponding to [121] is 192.100.3.11; the TCP/IP address corresponding to [122] is 192.100.3.21; the TCP/IP address corresponding to [130] is 192.175.3.1; the TCP/IP address corresponding to [131] is 192.176.3.1; the TCP/IP address corresponding to [132] is 192.180.3.28.

From the embodiment and method described above, we conclude that the present invention provides a method and a system of searching web site by which users can look for other web site of their interest by entering complete or incomplete numerals or texts in an input box on the page of the searching system. The searching system then searches the required web site for the users by using complete comparison or fuzzy comparison and displays the content of searched homepage to users' browsers. Users can also click on a pop-up menu for searching other web sites. In present invention, we use a novel method and system of searching web site, which use the methods of complete comparison and fuzzy comparison for search and the database of which uses number of digits for request classification. The system allows complete or misspelled words or correct- or wrong-digit numeral for input. In addition, the novel system can also provide pop-up menus for input. The method and system of searching web site of present invention have the following advantages:

1. Providing a method and a system of searching web site, which use the methods of complete comparison and fuzzy comparison for search and the database of which uses number of digits for request classification. The system allows complete or misspelled words or correct- or wrong-digit numeral for input. In addition, the novel system can also provide pop-up menus for input. Users enter their requests in input box or on a pop-up menu, and the searching system will find the web sites for the input.

2. Providing a searching system that can find other web sites according to input numbers by using complete comparison and fuzzy comparison method.

Although certain preferred embodiments of the present invention have been shown and described in detail, it should be understood that various changes and modifications may be made therein without departing from the scope of the appended claims.

What is claimed is:

1. A method of searching web sites used for a searching system including an entry web site, a search engine, a homepage database, a message control module, and a message output module, the method comprising the following steps:

(1) connecting a user's computer through the Internet to the searching system via hypertext transfer protocol (HTTP), to allow a homepage of the entry web site to display on a user's browser in the computer for a user to enter input numeral web site codes relating to a desired web site;

(2) sending the input numeral web site codes received from the homepage of the entry web site to the search engine through the Internet;

(3) having the search engine of the searching system search the homepage database having TCP/IP addresses of web sites and numeral web site codes corresponding to the TCP/IP addresses in which the numeral web site codes are classified by digits of numerals in a manner that each digit represents a predetermined category of web sites, to find a TCP/IP address corresponding to the input numeral web site codes or the numeral web site codes stored in the homepage database similar to the input numeral web site codes;

(4) sending the TCP/IP address obtained by the search engine to the message control module to then connect a web site through the Internet corresponding to the TCP/IP address received by the message control module; and (5) transmitting through the Internet a homepage of the connected web site by the message output module linked to the message control module to the browser of the computer for displaying; and the homepage database consists of a numeral correspondence database and the search engine of procedure (3) compares the input with the homepage database for searching TCP/IP addresses or complete domain names for the input by comparison methods, wherein sending data to the message control module of the searching system includes the following procedures:

(6) after receiving the input data from the web homepage, the search engine identifies the input as numerals;

(7) the search engine compares the numeral input with the numeral correspondence database; in the procedure of comparisons for numeral input, the search engine uses a complete comparison method and the numeral correspondence database to get the TCP/IP addresses or complete domain names corresponding to the numeral input and the procedure proceeds to step (4); if the complete comparison can not resolve the intended TCP/IP addresses or complete domain names, the procedure proceeds to step (3);

(8) the search engine uses a fuzzy method for comparison and finds the TCP/IP addresses or complete domain names closest to intended web sites and the procedure proceeds to step (4); and (9) the search engine sends the found TCP/IP addresses or complete domain names to the message control module of the searching system.

2. The method of searching web sites according to claim 1, wherein the homepage database consists of a numeral correspondence database and the search engine of procedure (3) compares the numeral input with the homepage database for searching TCP/IP addresses or complete domain names for the input by comparison methods, wherein sending data to the message control module of the searching system includes the following procedures:

(1) after receiving the input numeral data from the web homepage, the search engine will compare the input with the numeral correspondence database; the TCP/IP addresses or complete domain names for the input will be found from the comparisons; and (2) the search engine sends the found TCP/IP addresses or complete domain names to the message control module of the searching system.

3. The method of searching web sites according to claim 2, wherein the search engine of procedure (1) compares the numeral input with the numeral correspondence database; according to the comparisons, the search engine will find the TCP/IP addresses or complete domain names for the input; in the procedure of comparisons for numeral input, the search engine uses a complete comparison method and numeral correspondence database to get the TCP/IP addresses or complete domain names corresponding to the numeral input; if the complete comparison can not resolve the intended TCP/IP addresses or complete domain names, the search engine uses fuzzy method for comparison and finds the TCP/IP addresses or complete domain names closest to intended web sites.

4. The method of searching web sites according to claim 1, wherein the homepage database consists of a numeral correspondence database and the search engine of procedure (3) compares the numeral input with the homepage database for searching TCP/IP addresses or complete domain names for the input by comparison methods, wherein sending data to the message control module of the searching system includes the following steps:

(1) after receiving the input numeral data from the web homepage, the search engine compares the input numerals with the numeral correspondence database; in the procedure of comparisons for numeral input, the search engine uses a complete comparison method and the numeral correspondence database to get the TCP/IP addresses or complete domain names corresponding to the numeral input and the procedure proceeds to step (3); if the complete comparison can not resolve the intended TCP/IP addresses or complete domain names, the procedure proceeds to step (2);

(2) the search engine uses a fuzzy method for comparison and finds the TCP/IP addresses or complete domain names closest to intended web sites and the procedure proceeds to step (3); and (3) the search engine sends the found TCP/IP addresses or complete domain names to the message control module of the searching system.

5. A method of searching web sites used for a searching system that consists of: an entry web site, a search engine, a homepage database, a message control module, and a message output module, by which users at client computers can search the homepages of world wide web, and which includes the following procedure of searching entry web sites through the Internet:

(1) through a request of connecting to the searching system through the Internet according to hypertext transfer protocol (HTTP), a homepage of the searching system of the web site then displays on users' browser pages on local clients; users then enter their search requests in an input box of the homepage of the searching system after the connection between clients and the searching system is established;

(2) users enter their input numerals in the input box of the web homepage of the searching system; after receiving the input data of users, the entry web site sends the data in the input box to the search engine through the Internet;

(3) the search engine of the searching system then searches the required web sites according to the data by using complete comparison or fuzzy comparison with the homepage database in which data of web sites are stored as numerals and classified by digits of numerals in a manner that each digit represents a predetermined category of web sites, and either the corresponding TCP/IP addresses or domain names of searched homepages are identified and sent to the message control module through the Internet;

(4) the message control module then tries to connect the web sites of the TCP/IP addresses or domain names through the Internet; and (5) the message output module, which is controlled by the message control module, then transmits through the Internet the content of the homepages of the connected web sites to the browsers of clients for displaying; and the homepage database consists of a numeral correspondence database and the search engine of procedure (3) compares the input with the homepage database for searching TCP/IP addresses or complete domain names for the input by comparison methods, wherein sending data to the message control module of the searching system includes the following procedures:

(6) after receiving the input data from the web homepage, the search engine identifies the input as numerals;

(7) the search engine compares the numeral input with the numeral correspondence database; in the procedure of comparisons for numeral input, the search engine uses a complete comparison method and the numeral correspondence database to get the TCP/IP addresses or complete domain names corresponding to the numeral input and the procedure proceeds to step (4); if the complete comparison can not resolve the intended TCP/IP addresses or complete domain names, the procedure proceeds to step (3);

(8) the search engine uses a fuzzy method for comparison and finds the TCP/IP addresses or complete domain names closest to intended web sites and the procedure proceeds to step (4); and (9) the search engine sends the found TCP/IP addresses or complete domain names to the message control module of the searching system.

* * * * *

UNITED STATES PATENT AND TRADEMARK OFFICE
CERTIFICATE OF CORRECTION

PATENT NO.    : 6,604,098 B1
DATED         : August 5, 2003
INVENTOR(S)   : Kung It is certified that error appears in the above-identified patent and that said Letters Patent is hereby corrected as shown below:

<u>Title page,</u>
Item [*] Notice, delete the phrase "by 166 days" and insert -- by 321 days --

Signed and Sealed this

Eighteenth Day of May, 2004

JON W. DUDAS
*Acting Director of the United States Patent and Trademark Office*